US010902729B2

(12) United States Patent
Matsunaga et al.

(10) Patent No.: US 10,902,729 B2
(45) Date of Patent: Jan. 26, 2021

(54) VEHICLE, TRAVEL CONTROL DEVICE, AND TRAVEL CONTROL METHOD

(71) Applicant: HONDA MOTOR CO., LTD., Tokyo (JP)

(72) Inventors: Hideki Matsunaga, Wako (JP); Takumi Machida, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 213 days.

(21) Appl. No.: 16/166,868

(22) Filed: Oct. 22, 2018

(65) Prior Publication Data

US 2019/0122558 A1  Apr. 25, 2019

(30) Foreign Application Priority Data

Oct. 25, 2017  (JP) .................................. 2017-205841

(51) Int. Cl.
| | | |
|---|---|---|
| G08G 1/16 | (2006.01) | |
| G05D 1/00 | (2006.01) | |
| B60W 30/09 | (2012.01) | |
| B60W 30/12 | (2020.01) | |
| G01S 13/86 | (2006.01) | |
| G01S 13/931 | (2020.01) | |

(52) U.S. Cl.
CPC .............. *G08G 1/167* (2013.01); *B60W 30/09* (2013.01); *B60W 30/12* (2013.01); *G01S 13/865* (2013.01); *G01S 13/867* (2013.01); *G05D 1/0088* (2013.01); *G08G 1/166* (2013.01); *G01S 2013/932* (2020.01); *G01S 2013/9314* (2013.01); *G01S 2013/9317* (2013.01); *G01S 2013/9325* (2013.01); *G05D 2201/0213* (2013.01)

(58) Field of Classification Search
CPC ....... G08G 1/167; G08G 1/166; B60W 30/09; B60W 30/12; G01S 13/865; G01S 13/867; G05D 1/0088
See application file for complete search history.

(56) References Cited

U.S. PATENT DOCUMENTS

2017/0287331 A1* 10/2017 Laur .................. H04W 84/005

FOREIGN PATENT DOCUMENTS

| JP | 10-049672 A | 2/1998 |
|---|---|---|
| JP | 2009-096361 A | 5/2009 |
| JP | 2016-018484 A | 2/2016 |
| JP | 2016-126701 A | 7/2016 |
| JP | 2016-166013 A | 9/2016 |

OTHER PUBLICATIONS

Office Action dated Jun. 25, 2019 issued over the corresponding Japanese Patent Application No. 2017-205841 with the English translation thereof.

* cited by examiner

*Primary Examiner* — Michael D Lang
(74) *Attorney, Agent, or Firm* — Carrier Blackman & Associates, P.C.; Joseph P. Carrier; Jeffrey T. Gedeon (57) ABSTRACT

A travel control device for a host vehicle determines whether or not the presence of the vehicle prevents an external object, having the intension of moving from a second side lane to a first side lane, from crossing a host vehicle lane. Upon determining that the presence of the host vehicle prevents the external object from crossing the host vehicle lane, the travel control device moves the host vehicle to create a space for the external object to cross the host vehicle lane.

7 Claims, 7 Drawing Sheets

VEHICLE, TRAVEL CONTROL DEVICE, AND TRAVEL CONTROL METHOD

CROSS-REFERENCE TO RELATED APPLICATION

This application is based upon and claims the benefit of priority from Japanese Patent Application No. 2017-205841 filed on Oct. 25, 2017, the contents of which are incorporated herein by reference.

BACKGROUND OF THE INVENTION

Field of the Invention

The present invention relates to a vehicle, a travel control device, and a travel control method for allowing passage of other vehicles and the like when a driver's own vehicle (which will be also referred to as a host vehicle) blocks the paths of the other vehicles and the like.

Description of the Related Art

Japanese Laid-Open Patent Publication No. 2016-166013 has an object of providing an in-vehicle apparatus reducing sense of uneasiness caused to pedestrians and drivers of other vehicles around the vehicle (paragraph [0006] and Abstract). To achieve this object, the in-vehicle apparatus described in Japanese Laid-Open Patent Publication No. 2016-166013 (Abstract) includes a camera 31, a radar device 32, a sensor such as a sonar device 33, a display device 20A, and a light emission control unit 40a (control means). The sensor detects the positional relationship between the vehicle and people around the vehicle. The display device 20A includes a display portion 40 provided on the vehicle at a position visible to the people around the vehicle. The display portion 40 displays a specific light emitting portion emitting light in a specific manner such that the specific light emitting portion is moved horizontally and is visually recognizable. The light emission control portion 40a displays the specific light emitting portion such that the specific light emitting portion stops moving in the display unit 40 at a display position on a side adjacent to the people based on detection results obtained by the sensor.

The term "people around the vehicle" (or approaching people" here includes pedestrians, cyclists, motorcyclists, and drivers of automobiles (paragraph [0013]). The people around the vehicle (or the approaching people) are those who might collide with the host vehicle with a probability of a predetermined value or more (paragraph [0020]).

Moreover, the term "light emission in a specific manner" here includes display prompts such as "After you" for informing the approaching people that the host vehicle intends to yield to the approaching people and display of figures such as arrows (paragraph [0021]). Such light emission may be accompanied by a backward movement of the vehicle by a predetermined distance (for example, a few centimeters), change of the artificial engine sound from driving sound to idling sound, switch-off of the artificial engine sound, and voice prompts such as "After you" (paragraph [0021]).

SUMMARY OF THE INVENTION

As described above, the vehicle moves backward in addition to the display prompts such as "After you" in Japanese Laid-Open Patent Publication No. 2016-166013 (paragraph [0021]). However, the backward movement aims only at informing the approaching people the host vehicle might collide with that the host vehicle intends to yield to the approaching people (paragraphs [0020] and [0021]). Thus, the vehicle moves backward by a predetermined distance, for example, a few centimeters (paragraph [0021]). That is, moving the vehicle to allow passage of other vehicles and the like when the host vehicle is blocking the paths of the other vehicles and the like is not discussed in Japanese Laid-Open Patent Publication No. 2016-166013.

The present invention has been devised taking into consideration the aforementioned problems, and has the object of providing a vehicle, a travel control device, and a travel control method allowing passage of other vehicles and the like when the host vehicle is blocking the paths of the other vehicles and the like.

A vehicle according to the present invention includes:

an external environment detecting device configured to detect a first side lane beside a host vehicle lane in which the vehicle is traveling and an external object in a second side lane lying on a side of the host vehicle lane opposite the side on which the first side lane lies; and a travel control device configured to determine whether or not the vehicle blocks the external object having an intention of moving from the second side lane to the first side lane from crossing the vehicle lane and, upon determining that the vehicle blocks the external object from crossing the host vehicle lane, configured to move the vehicle to create a space for the external object to cross the host vehicle lane.

According to the present invention, upon determining that the driver's own vehicle (host vehicle) blocks the external object, having the intention of moving from the second side lane to the first side lane, from crossing the host vehicle lane, the host vehicle is moved to create the space for the external object to cross the host vehicle lane. This enables the external object to cross the vehicle lane and enter the first side lane. The external environment detecting device may include, for example, an external environment sensor, a map positioning unit, and the like described below.

The first side lane may include a gateway to a parking lot accessible only to authorized users. The first side lane and the second side lane may be linearly located with the host vehicle lane between the first and second side lanes. The external object may be, for example, the other vehicle, a bicycle, or a pedestrian. The movement of the host vehicle to create the space for the external object to cross the host vehicle lane includes at least one of a backward movement and a forward movement.

The travel control device may determine a position of the first side lane before reaching the first side lane based on output from the external environment detecting device and store the position in a storage unit. Moreover, the travel control device may calculate a relative position of the vehicle with respect to the position of the first side lane stored in the storage unit. This enables the relative position of the host vehicle with respect to the first side lane to be determined even in a case where the external environment detecting device (for example, cameras or LIDAR) does not detect immediately beside the host vehicle or where the host vehicle cannot detect the first side lane after being stopped immediately beside the first side lane.

The travel control device may set a storage condition serving as a condition for storing the position of the first side lane in the storage unit. Moreover, when the storage condition is met, the travel control device may store the position of the first side lane in the storage unit. The storage condition may include a state where the host vehicle is decelerating.

Thus, the position of the first side lane is stored only when the position of the first side lane needs to be stored. This reduces the computing load. It may be determined that the host vehicle is decelerating at the start of deceleration of the vehicle.

The travel control device may erase the position of the first side lane from the storage unit after the host vehicle starts to pass by the first side lane. Thus, the position of the first side lane is stored only when the position of the first side lane may be used. This reduces the required storage area.

The external environment detecting device may detect an adjacent vehicle serving as at least one of a front vehicle and a rear vehicle in the host vehicle lane. Moreover, the travel control device may observe whether or not the external object is sending a signal indicating that the external object is going to enter the first side lane from the second side lane while the host vehicle is stopped in the host vehicle lane before the first side lane. Furthermore, upon detecting the entrance signal, the travel control device may determine whether or not the space for crossing can be created by moving the host vehicle in a direction toward the adjacent vehicle based on a distance between the host vehicle and the adjacent vehicle and a relative position of the vehicle with respect to the first side lane. Yet furthermore, upon determining that the space for crossing can be created, the travel control device may create the space for crossing by moving the host vehicle in the direction toward the adjacent vehicle.

This enables the space for the external object to cross the host vehicle lane to be created even when there is the adjacent vehicle behind or in front of the host vehicle.

The external environment detecting device may detect a front vehicle in the host vehicle lane and a rear vehicle in the host vehicle lane. Moreover, upon detecting a signal indicating that the external object is going to enter the first side lane from the second side lane while the host vehicle is stopped in the vehicle lane before the first side lane, the travel control device may determine whether or not the space for crossing can be created by bringing the host vehicle close to the front vehicle or the rear vehicle based on a first distance between the host vehicle and the front vehicle, a second distance between the host vehicle and the rear vehicle, and a relative position of the vehicle with respect to the first side lane. Furthermore, upon determining that the space for crossing can be created both in front of and behind the host vehicle, the travel control device may bring the host vehicle close to the front vehicle.

This enables the space for the external object to cross the host vehicle lane to be created even when there are the adjacent vehicles behind and in front of the host vehicle. Moreover, the approach of the host vehicle may surprise an occupant in the rear vehicle more compared with an occupant in the front vehicle since backward is the direction opposite the direction of travel. In the present invention, forward movement takes precedence over backward movement not to surprise the occupant in the rear vehicle.

A travel control device according to the present invention configured to: acquire information about a first side lane and an external object from an external environment detecting device configured to detect the first side lane beside a host vehicle lane in which a host vehicle travels and the external object in a second side lane lying on a side of the host vehicle lane opposite the side on which the first side lane lies; determine whether or not the host vehicle blocks the external object having an intention of moving from the second side lane to the first side lane from crossing the host vehicle lane; and move the host vehicle to create a space for the external object to cross the host vehicle lane upon determining that the host vehicle blocks the external object from crossing the host vehicle lane.

A travel control method according to the present invention includes the steps of: detecting an external object in a side lane beside a host vehicle lane in which a host vehicle travels using an external environment detecting device; determining whether or not the host vehicle stopped blocks the external object having an intention of crossing the host vehicle lane from crossing the host vehicle lane using a travel control device; and moving the host vehicle to create a space for the external object to cross the vehicle lane using the travel control device upon determining that the presence of the host vehicle prevents the external object from crossing the host vehicle lane.

According to the present invention, upon determining that the stopped host vehicle blocks the external object, having the intention of crossing the host vehicle lane, from crossing the host vehicle lane, the vehicle is moved to create the space for the external object to cross the host vehicle lane. This enables the external object to cross the vehicle lane and enter another side lane.

According to the present invention, the host vehicle allows passage of the other vehicles and the like when the host vehicle blocks the paths of the other vehicles and the like.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

A. Embodiment

<A-1. Configuration>
[A-1-1. Overview]

Figure 1:
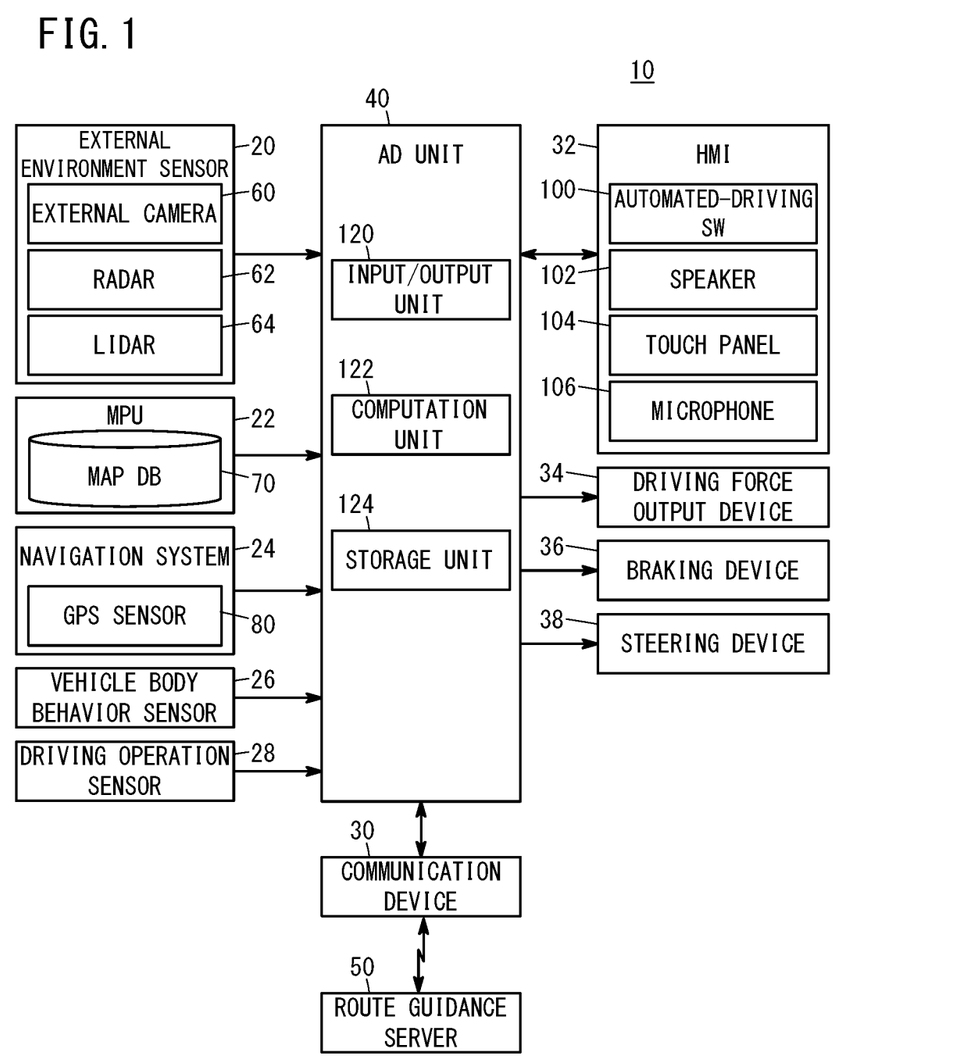
FIG. 1 is a block diagram schematically illustrating the configuration of a vehicle according to an embodiment of the present invention.

FIG. 1 is a block diagram schematically illustrating the configuration of a vehicle 10 according to an embodiment of the present invention. A vehicle 10 (hereinafter also referred to as "host vehicle 10") includes an external environment sensor 20, a map positioning unit 22 (hereinafter referred to as "MPU 22"), a navigation system 24, a vehicle body behavior sensor 26, a driving operation sensor 28, a communication device 30, a human-machine interface 32 (hereinafter referred to as "HMI 32"), a driving force output device 34, a braking device 36, a steering device 38, and a automated-driving control unit 40 (hereinafter referred to as "AD unit 40").

[A-1-2. External Environment Sensor 20]

The external environment sensor 20 (external environment detecting device) detects information about the environment of the vehicle 10 (hereinafter also referred to as "environmental information Ie"). The external environment sensor 20 according to this embodiment detects, for example, an approach road 322 (first side lane) to a parking lot 314 beside a vehicle lane 312a in which the vehicle 10 travels (see FIG. 3). The external environment sensor 20 further detects a front vehicle 320b and a rear vehicle 320c in the vehicle lane 312a. The external environment sensor 20 yet further detects external objects such as another vehicle 330 in the opposite lane 312b (second side lane) lying on a side of the vehicle lane 312a opposite the side on which the approach road 322 of the parking lot 314 lies.

As illustrated in FIG. 1, the external environment sensor 20 includes a plurality of external cameras 60, a plurality of radars 62, and a light detection and ranging (LIDAR) system 64.

The external cameras 60 (hereinafter also referred to as "cameras 60") output image information Iimage about captured surrounding images Fs of the surroundings (front, sides, and rear) of the vehicle 10. The radars 62 output radar information Iradar indicating reflected waves of electromagnetic waves transmitted toward the surroundings (front, sides, and rear) of the vehicle 10. The LIDAR 64 continuously emits laser beams in every direction of the vehicle 10, measures three-dimensional positions of reflecting points based on the reflected waves, and outputs three-dimensional information Ilidar about the positions.

[A-1-3. MPU 22]

The MPU 22 (external environment detecting device) controls a map database 70 (hereinafter referred to as "map DB 70" or "first map DB 70"). The first map DB 70 stores map information Imap with position accuracy of centimeters or less. The MPU 22 provides the map information Imap in response to requests from the navigation system 24 or the AD unit 40.

[A-1-4. Navigation System 24]

The navigation system 24 includes a global positioning system sensor 80 (hereinafter referred to as "GPS sensor 80"). The GPS sensor 80 detects the current position Pcur of the vehicle 10. The navigation system 24 calculates a target route Rtar from the current position Pcur to a destination Ptar to guide occupant. To calculate the target route Rtar, the navigation system 24 uses the map information Imap acquired from a map database (second map database; not illustrated) included in its own system. The accuracy of the map information Imap included in the second map database is lower than the accuracy of the map information Imap included in the first map DB 70. The destination Ptar is input through the HMI 32 (in particular, a touch panel 104 or a microphone 106).

[A-1-5. Vehicle Body Behavior Sensor 26]

The vehicle body behavior sensor 26 detects information about behaviors of the vehicle 10, in particular of the vehicle body (hereinafter also referred to as "body behavior information Ib"). The vehicle body behavior sensor 26 includes a vehicle speed sensor, an accelerometer, and a yaw rate sensor (all not illustrated). The vehicle speed sensor detects the vehicle speed V [km/h] and the direction of travel of the vehicle 10. The accelerometer detects the acceleration G [m/s$^2$] of the vehicle 10. The acceleration G includes the longitudinal acceleration α, the lateral acceleration Glat, and the vertical acceleration Gv (the acceleration G may not include the accelerations in all directions). The yaw rate sensor detects the yaw rate Y [rad/s] or the vehicle 10.

[A-1-6. Driving Operation Sensor 28]

The driving operation sensor 28 detects information about driving operations by a driver (hereinafter also referred to as "driving information Ido"). The driving operation sensor 28 includes an accelerator pedal sensor and a brake pedal sensor (both not illustrated). The accelerator pedal sensor detects an operational input [%] through an accelerator pedal (not illustrated). The brake pedal sensor detects an operation input [%] through a brake pedal (not illustrated). The driving operation sensor 28 may include a steering angle sensor, a steering torque sensor, and the like (all not illustrated).

[A-1-7. Communication Device 30]

The communication device 30 communicates with external devices wirelessly. The external devices here include, for example, a route guidance server 50. Although it is assumed that the communication device 30 in this embodiment is installed (or constantly fixed) in the vehicle 10, the communication device 30 may be portable outside the vehicle 10 as are, for example, cellular phones and smartphones.

[A-1-8. HMI 32]

The HMI 32 (destination input section) receives operational inputs from an occupant and gives visual, audible, and tactile presentations of various pieces of information to the occupant. The HMI 32 includes an automated-driving switch 100 (hereinafter also referred to as "automated-driving SW 100"), a speaker 102, the touch panel 104, and the microphone 106.

The occupant operates the automated-driving SW 100 to issue commands to start or end automated-driving control. Instead of or in addition to the automated-driving SW 100, the commands to start or end the automated-driving control may be issued using other methods (for example, voice input through the microphone 106). The touch panel 104 includes, for example, a liquid crystal panel or an organic electroluminescent (EL) panel.

[A-1-9. Driving Force Output Device 34]

The driving force output device 34 includes a driving source for traveling (for example, an engine or a traveling motor; not illustrated) and an electronic control unit for driving (hereinafter referred to as "driving ECU"; not illustrated). The driving ECU controls the driving source to adjust the driving force of the vehicle 10 for traveling based on the operational inputs through the accelerator pedal or commands from the AD unit 40.

[A-1-10. Braking Device 36]

The braking device 36 includes a brake motor (or a hydraulic mechanism; not illustrated), braking members (not illustrated), and an electronic control unit for braking (hereinafter referred to as "braking ECU"; not illustrated). The braking device 36 may control engine braking by the engine and/or regenerative braking by the traveling motor. The braking ECU activates the brake motor and the like to control the braking force of the vehicle 10 based on the operational inputs through the brake pedal or the commands from the AD unit 40.

[A-1-11. Steering Device 38]

The steering device 38 includes an electric power steering (EPS) motor (not illustrated) and an electronic control unit for EPS (hereinafter referred to as "EPS ECU";

not illustrated). The EPS ECU controls the EPS motor to control the steering angle of the vehicle 10 in response to operations of a steering wheel by the driver or the commands from the AD unit 40.

[A-1-12. AD Unit 40]

(A-1-12-1. Overview of AD Unit 40)

The AD unit 40 (travel control device) includes, for example, a central processing unit (CPU) and performs the automated-driving control enabling the vehicle 10 to be driven to the destination Ptar without requiring driving operations (acceleration, deceleration, and steering) by the driver. The AD unit 40 includes an input/output unit 120, a computation unit 122, and a storage unit 124.

The input/output unit 120 inputs and outputs data from and to instruments other than the AD unit 40 (for example, the sensors 20, 26, 28). The computation unit 122 performs computations based on signals from the sensors 20, 26, 28, the communication device 30, the HMI 32, and the like. The computation unit 122 then generates signals to be sent to the communication device 30, the HMI 32, the driving force output device 34, the braking device 36, and the steering device 38 based on the computation results. Details of the computation unit 122 will be described below with reference to FIG. 2.

The storage unit 124 stores programs and data used by the computation unit 122. The storage unit 124 includes, for example, random-access memory (hereinafter referred to as "RAM"). Volatile memory such as registers and nonvolatile memory such as flash memory may be used as RAM. The storage unit 124 may include read-only memory (hereinafter referred to as "ROM") in addition to RAM.

(A-1-12-2. Computation Unit 122)

Figure 2:
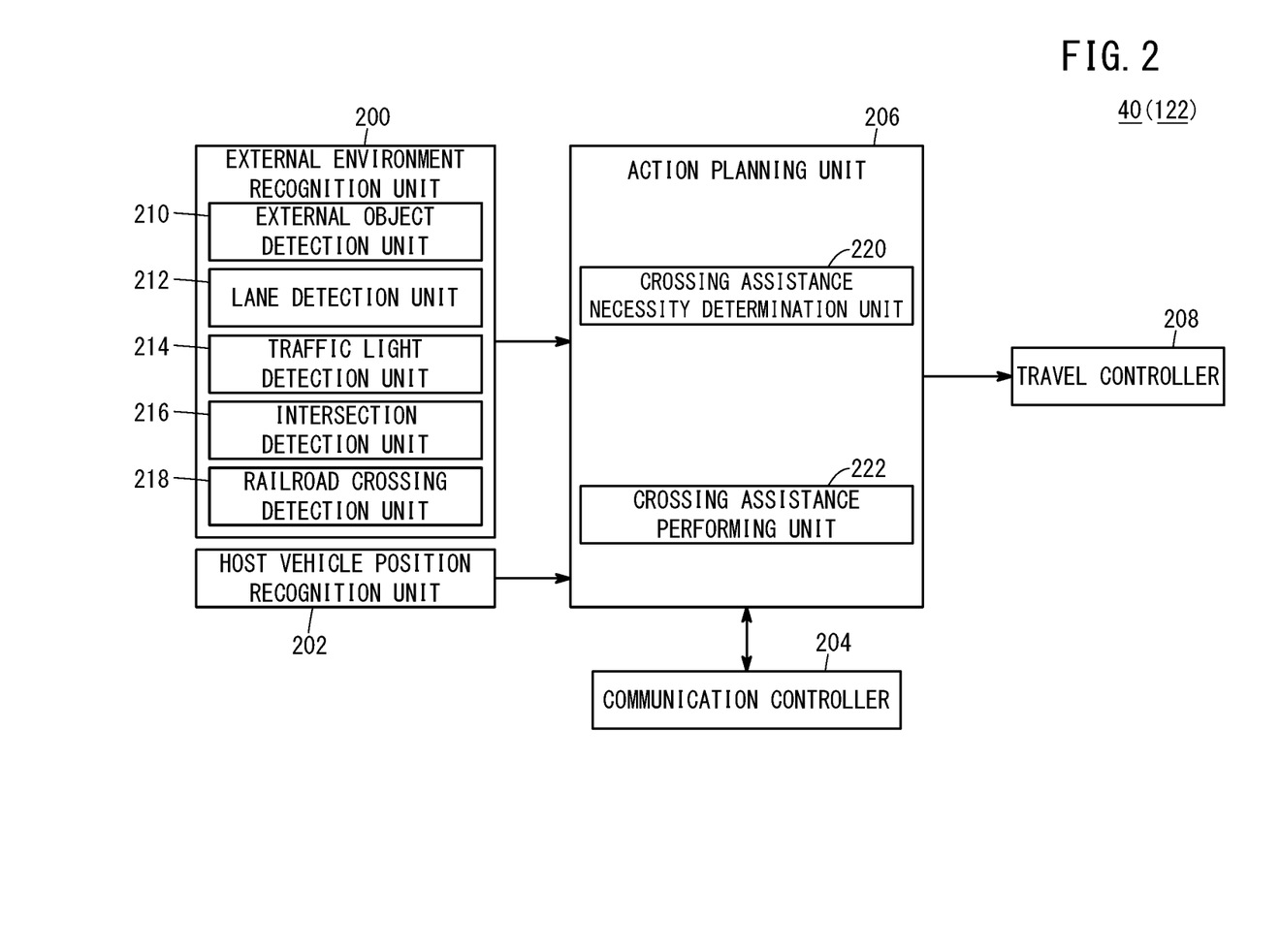
FIG. 2 is a diagram showing various units in a computation unit of an automated-driving control unit according to the above-described embodiment.

FIG. 2 illustrates various units in the computation unit 122 in the automated-driving control unit 40 according to this embodiment. As illustrated in FIG. 2, the computation unit 122 in the AD unit 40 includes an external environment recognition unit 200, a host vehicle position recognition unit 202, a communication controller 204, an action planning unit 206, and a travel controller 208. Those units are realized by, for example, the computation unit 122 (for example, a CPU) executing programs stored in the storage unit 124 in the AD unit 40. The programs may be supplied from an external management server (not illustrated) via the communication device 30. The programs may also be partially composed of hardware (circuit components).

The external environment recognition unit 200 recognizes circumstances and objects around the host vehicle 10 based on the environmental information Ie from the external environment sensor 20 (FIG. 1). The external environment recognition unit 200 recognizes the whole road conditions such as the shapes and widths of roads, the positions of lane marks, the number and widths of lanes, and lighting states of traffic lights based on the image information Iimage from the external cameras 60.

As illustrated in FIG. 2, the external environment recognition unit 200 includes an external object detection unit 210, a lane detection unit 212, a traffic light detection unit 214, an intersection detection unit 216, and a railroad crossing detection unit 218. The external object detection unit 210 detects external objects O around the host vehicle 10. The external objects O include, for example, the other vehicles 320*a*, 320*b*, 320*c*, 330 (FIG. 3) serving as adjacent vehicles. The image information Iimage from the external cameras 60 is used to detect the external objects O. Alternatively, the other vehicles 320*a*, 320*b*, 320*c*, 330 may be detected by communicating with the other vehicles 320*a*, 320*b*, 320*c*, 330 via the communication device 30.

The lane detection unit 212 detects the lanes 312*a*, 312*b* and the approach road 322 (FIG. 3) around the host vehicle 10. The image information Iimage from the external cameras 60 is used to detect the lanes 312*a*, 312*b* and the approach road 322. Alternatively, the lanes 312*a*, 312*b* and the approach road 322 may be detected using the current position Pcur of the host vehicle 10 and the map information Imap.

The traffic light detection unit 214 detects a traffic light 318 (FIG. 3) located in the direction of travel of the host vehicle 10. The image information Iimage from the external cameras 60 is used to detect the traffic light 318. Alternatively, the traffic light 318 may be detected using the current position Pcur of the vehicle 10 and the map information Imap. Alternatively, the traffic light 318 may be detected by communicating with roadside beacons (not illustrated) via the communication device 30.

The intersection detection unit 216 detects intersections around the host vehicle 10. The image information Iimage from the external cameras 60 is used to detect the intersections. Alternatively, the intersections may be detected using the current position Pcur of the host vehicle 10 and the map information Imap. Alternatively, the intersections may be detected by communicating with the roadside beacons (not illustrated) via the communication device 30.

The railroad crossing detection unit 218 detects railroad crossings (not illustrated) around the host vehicle 10. The image information Iimage from the external cameras 60 is used to detect the railroad crossings. Alternatively, the railroad crossings may be detected using the current position Pcur of the host vehicle 10 and the map information Imap. Alternatively, the railroad crossings may be detected by communicating with the roadside beacons (not illustrated) via the communication device 30.

The host vehicle position recognition unit 202 accurately recognizes the current position Pcur of the vehicle 10 based on the recognition results obtained by the external environment recognition unit 200, the map information Imap from the MPU 22, and the current position Pcur from the navigation system 24. The communication controller 204 controls communication between the AD unit 40 and external instruments (for example, the route guidance server 50).

The action planning unit 206 calculates a target path Ltar of the host vehicle 10 to the destination Ptar input through the HMI 32. The action planning unit 206 then determines the traveling state of the host vehicle 10 based on the recognition results obtained by the external environment recognition unit 200 and the host vehicle position recognition unit 202 and the detection results obtained by the vehicle body behavior sensor 26, and updates the target path Ltar to plan various actions of the vehicle 10.

The target route Rtar calculated by the navigation system 24 is only a relatively broad outline indicating which road the driver should take. In contrast, the target path Ltar calculated by the action planning unit 206 includes relatively small details for controlling acceleration, deceleration, and steering of the vehicle 10 in addition to the broad outline calculated by the navigation system 24.

The action planning unit 206 includes a crossing assistance necessity determination unit 220 and a crossing assistance performing unit 222. The crossing assistance necessity determination unit 220 determines the necessity of assisting the other vehicle 330 (FIG. 3) to cross the road. The crossing assistance performing unit 222 performs the crossing assistance when the crossing assistance necessity determination unit 220 determines that the crossing assistance is required.

The travel controller 208 calculates and sends control commands to the driving force output device 34, the braking device 36, and the steering device 38 based on the determination results obtained by the action planning unit 206 (the target path Ltar, the target vehicle speed, and the like). In other words, the travel controller 208 controls outputs from actuators controlling body behaviors. The actuators here include, for example, the engine, the brake motor, and the EPS motors. The travel controller 208 controls the outputs from the actuators, that is, controls the behavioral amount of the vehicle 10, in particular of the body (hereinafter referred to as "body behavioral amount Qb"). The body behavioral amount Qb here includes, for example, the vehicle speed V, the longitudinal acceleration $\alpha$, the steering angle $\theta$st, the lateral acceleration Glat, and the yaw rate Y.

[A-1-13. Route Guidance Server 50]

Instead of the vehicle 10, the route guidance server 50 generates or calculates the target route Rtar to the destination Ptar based on the current position Pcur of the vehicle 10 and the destination Ptar received from the communication device 30. The route guidance server 50 includes an input/output unit, a communication unit, a computation unit, and a storage unit (all not illustrated). The storage unit stores programs and data used by the computation unit.

<A-2. Controls Performed in This Embodiment>

[A-2-1. Overview]

The vehicle 10 according to this embodiment is capable of performing the automated-driving control enabling the vehicle 10 to be automatically driven to the destination Ptar. The AD unit 40 performs the automated-driving control.

In the automated-driving control according to this embodiment, the AD unit 40 performs the crossing assistance control. The crossing assistance control assists the external objects O such as the other vehicle 330 (FIG. 3) to cross the vehicle lane 312a.

[A-2-2. Crossing Assistance Control]

(A-2-2-1. Overview)

Figure 3:
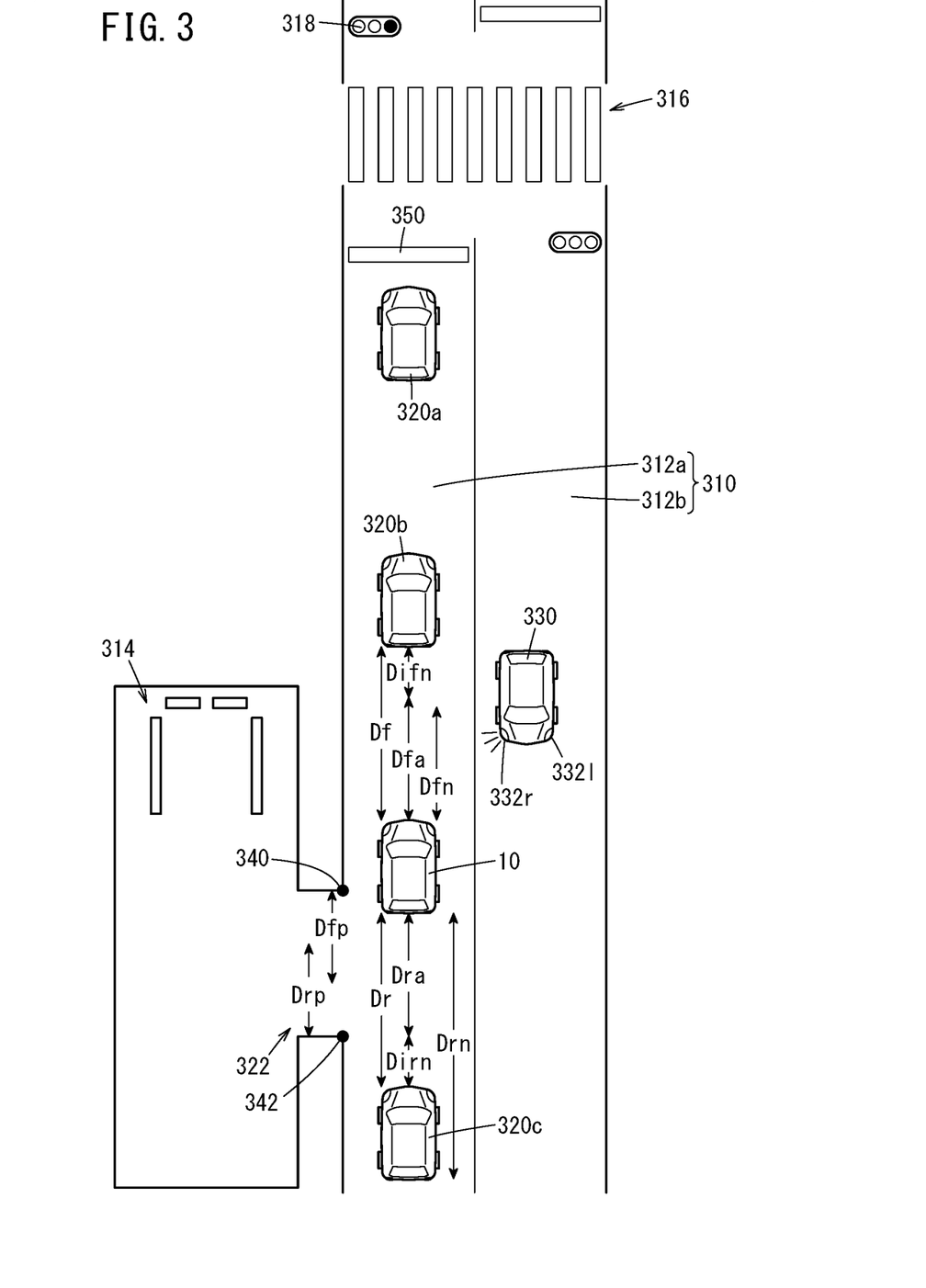
FIG. 3 is a diagram showing a first state illustrating crossing assistance control in the above-described embodiment.
Figure 4:
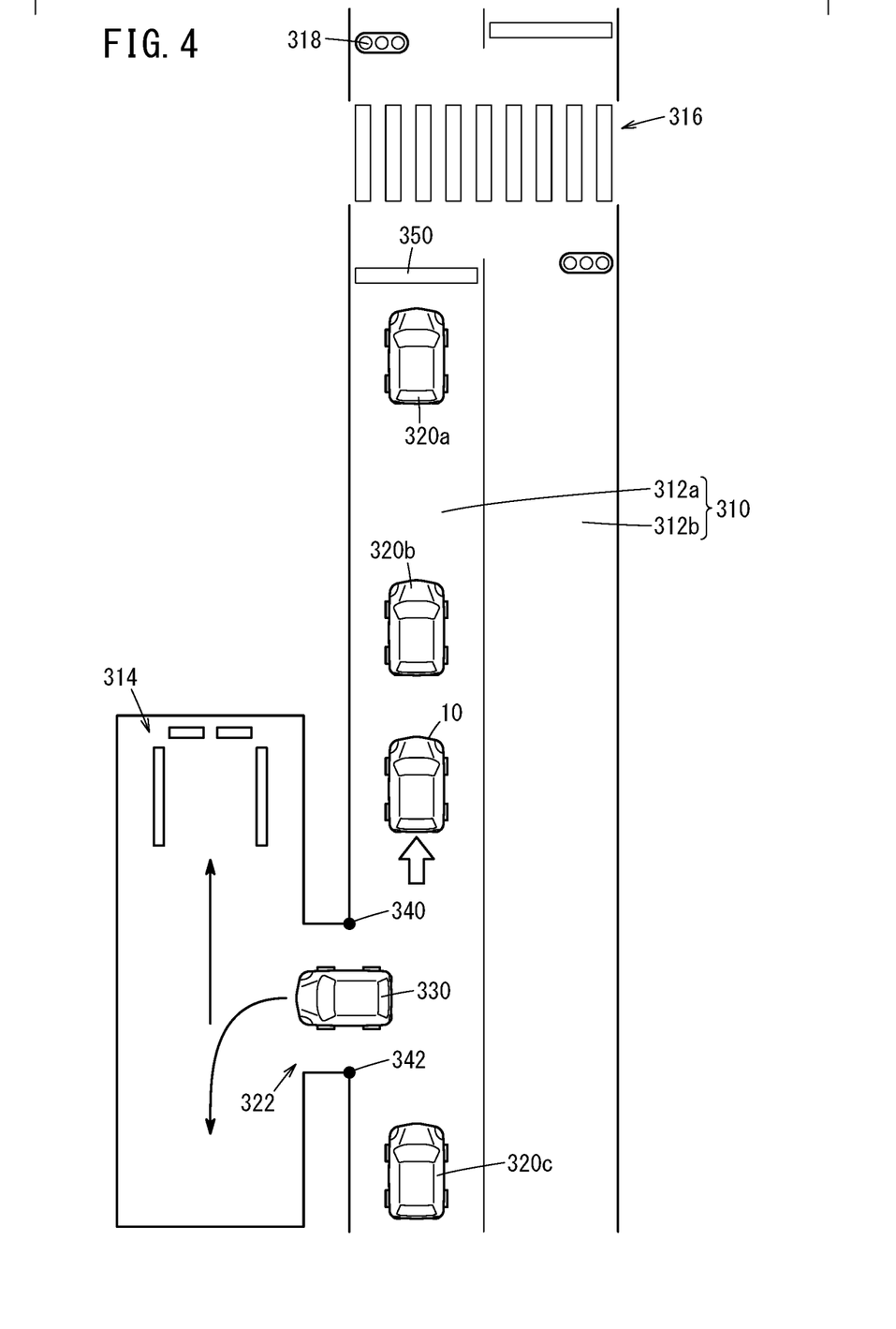
FIG. 4 is a diagram showing a second state illustrating the crossing assistance control in the above-described embodiment.

FIGS. 3 and 4 respectively indicate a first state and a second state illustrating the crossing assistance control in this embodiment. In this embodiment, the vehicle 10 is driven on the left side of the road. A road 310 on which the vehicle 10 is traveling is a two-lane road, and includes the lane 312a in which the vehicle 10 is traveling (hereinafter also referred to as "host vehicle lane 312a") and the opposite lane 312b. The parking lot 314 for private use lies beside the vehicle lane 312a.

In FIG. 3, the traffic light 318 corresponding to a crosswalk 316 is red. Thus, the host vehicle 10, the front vehicles 320a and 320b, and the rear vehicle 320c are stopped in the vehicle lane 312a. The host vehicle 10 is stopped in front of the approach road 322 to the parking lot 314.

In the opposite lane 312b, the other vehicle 330 (oncoming vehicle) is stopped in the vicinity (or in front) of the host vehicle 10. The other vehicle 330 is flashing on and off a blinker 332r adjacent to the parking lot 314 (or the host vehicle 10). That is, the other vehicle 330 is ready to enter the parking lot 314 but is stopped in the opposite lane 312b as the vehicle 10 is blocking the approach road 322.

In this case, the host vehicle 10 according to this embodiment performs the crossing assistance control to assist the other vehicle 330 to cross the vehicle lane 312a. More specifically, as illustrated in FIG. 4, the host vehicle 10 moves (forward in the example in FIG. 4) to allow the other vehicle 330 to cross the vehicle lane 312a. This enables the other vehicle 330 to cross the vehicle lane 312a and enter the parking lot 314.

(A-2-2-2. Detailed Flow of Crossing Assistance Control)

(A-2-2-2-1. Overall Flow of Crossing Assistance Control)

Figure 5:
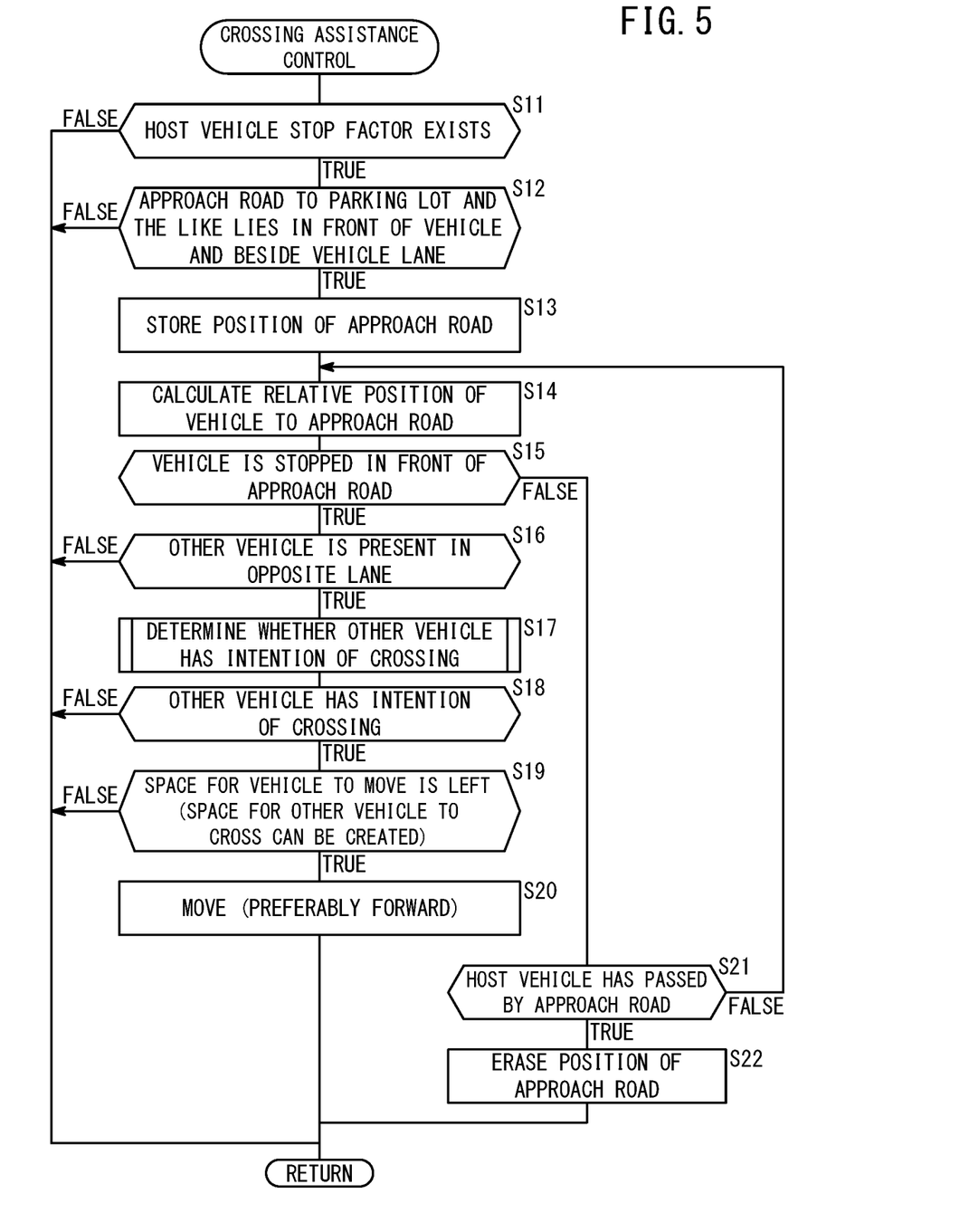
FIG. 5 is a flow chart illustrating the crossing assistance control according to the above-described embodiment.

FIG. 5 is a flow chart illustrating the crossing assistance control according to this embodiment. In step S11, the AD unit 40 determines whether or not an automatic stop factor F exists. The automatic stop factor F requires the host vehicle 10 heading for the destination Ptar to stop. The automatic stop factor F is stored (or set) in the storage unit 124 in advance. When an automatic stop factor F occurs, the host vehicle 10 may still be traveling. When an automatic stop factor F occurs while the host vehicle 10 is traveling, the host vehicle 10 needs to decelerate to stop. Thus, the occurrence of the automatic stop factor F means that the vehicle 10 starts decelerating.

The automatic stop factor F may include, for example, change of the traffic light 318 (FIG. 3) to red, traffic congestion in the vehicle lane 312a, and warning of passage of a train by a railroad crossing (for example, a sounding alarm).

It may be determined that the traffic light 318 has changed to red by, for example, using the image information Iimage from the external cameras 60. Alternatively, it may be determined by acquiring information about the traffic light 318 from the roadside beacons (not illustrated) disposed along the vehicle lane 312a.

It may be determined that the vehicle lane 312a is congested based on, for example, traffic information acquired from the route guidance server 50 or the roadside beacons (not illustrated) via the communication device 30. Alternatively, it may be determined by acquiring traffic information from the adjacent vehicles (other vehicles 320a, 320b, 320c, and the like) via vehicle-to-vehicle communication. Alternatively, the traffic congestion in the vehicle lane 312a may be determined by using the image information Iimage from the external cameras 60.

It may be determined that the railroad crossing is warning of passage of a train by, for example, detecting blinking of a warning light and/or displacement of a crossing gate using the image information Iimage from the external cameras 60. Alternatively, it may be determined by detecting an alarm of the railroad crossing using an external microphone (not illustrated).

The automatic stop factor F may be defined as one of the conditions (storage conditions) for performing step S13 (storing the position Ps of the approach road 322) described below.

If the automatic stop factor F exists (TRUE in S11), then the AD unit 40 determines whether or not the approach road 322 (first side lane) to the parking lot 314, stores, and the like lie in front of the host vehicle 10 and beside the vehicle lane 312a in step S12. This determination is performed based on, for example, the image information Iimage from the external cameras 60. Alternatively, the determination may be performed based on information about the current position Pcur detected by the GPS sensor 80 (hereinafter also referred to as "current position information Ipc") and the map information Imap in the map DB 70.

If the approach road 322 lies in front of the vehicle 10 and beside the vehicle lane 312a (TRUE in S12), then the AD unit 40 stores the position Ps of the approach road 322 in the storage unit 124 in step S13. For example, the position Ps is defined as the positions of the front end 340 and the rear end 342 of the approach road 322 in a direction along the vehicle lane 312a. The determination of the position Ps is performed using the image information Iimage from the external cameras 60. Alternatively, the position Ps of the approach road 322 may be determined using the three-dimensional information Ilidar obtained by the LIDAR 64.

Since the position Ps of the approach road 322 is stored temporarily, the storage unit 124 used in step S13 is preferably a memory and the like writable at high speed instead of a hard disk and the like requiring more time for writing.

In step S14, the AD unit 40 calculates a relative position P1 of the host vehicle 10 with respect to the approach road 322. This calculation is performed by, for example, using the moving direction and a travel distance Dv of the host vehicle 10 after the position Ps of the approach road 322 is detected.

In step S15, the AD unit 40 determines whether or not the host vehicle 10 is stopped in front of the approach road 322 (in other words, whether or not the vehicle 10 is blocking the approach road 322). This determination is performed based on the relative position P1 of the vehicle 10 with respect to the approach road 322. If the host vehicle 10 is stopped in front of the approach road 322 (TRUE in S15), then the process proceeds to step S16.

In step S16, the AD unit 40 determines whether or not the other vehicle 330 is present in the opposite lane 312b. If the other vehicle 330 is present in the opposite lane 312b (TRUE in S16), then the AD unit 40 determines whether or not the other vehicle 330 has the intention of crossing the vehicle lane 312a (intention of entering the approach road 322) in step S17. This determination will be described in detail below with reference to FIG. 6. If it is determined that the other vehicle 330 has the intention of crossing the vehicle lane 312a (TRUE in S18), then the process proceeds to step S19.

In step S19, the AD unit 40 determines whether or not a space Shv for the vehicle 10 to move is left in front of or behind the host vehicle 10. In other words, it is determined whether or not a space St for the other vehicle 330 to cross the vehicle lane 312a is created by moving the host vehicle 10 forward or backward. This determination will be described in detail below.

If the space Shv is left (TRUE in S19), then the AD unit 40 moves the host vehicle 10 to the space Shv in step S20. This enables the other vehicle 330 to cross the vehicle lane 312a and enter the parking lot 314. If the space Shv is left both in front of and behind the host vehicle 10, then the AD unit 40 uses the space Shv in front of the host vehicle 10 over the other. Alternatively, the AD unit 40 may select the space Shv enabling the host vehicle 10 to move a shorter distance.

The AD unit 40 may inform the occupant of the transfer of the host vehicle 10 to the space Shv via the HMI 32 before moving the vehicle 10.

In step S15, if the host vehicle 10 is not stopped in front of the approach road 322 (FALSE in S15), then the AD unit 40 determines whether or not the host vehicle 10 has passed by the approach road 322 in step S21. If the vehicle 10 has not passed by the approach road 322 (FALSE in S21), then the process returns to step S14. If the host vehicle 10 has passed by the approach road 322 (TRUE in S21), then the AD unit 40 erases the position Ps of the approach road 322 from the storage unit 124 in step S22.

(A-2-2-2-2. Determination of Whether Other Vehicle 330 has Intention of Crossing; S17 in FIG. 5)

Figure 6:
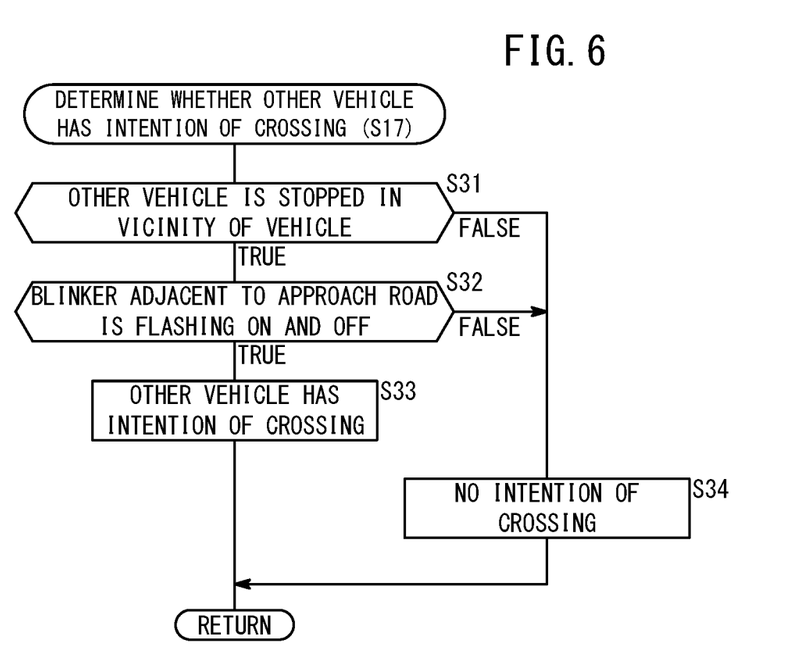
FIG. 6 is a flow chart illustrating how the automated-driving control unit determines whether or not another vehicle has an intention of crossing (details of S17 in FIG. 5) in the above-described embodiment.

FIG. 6 is a flow chart illustrating how the AD unit 40 determines whether or not the other vehicle 330 has the intention of crossing (details of S17 in FIG. 5) in this embodiment. In step S31, the AD unit 40 determines whether or not the other vehicle 330 in the opposite lane 312b is stopped in the vicinity of the host vehicle 10. This determination is performed by, for example, determining whether or not the other vehicle 330 is stopped within a predetermined range in front of or beside the host vehicle 10. If the other vehicle 330 is stopped in the vicinity of the host vehicle 10 (TRUE in S31), then the process proceeds to step S32.

In step S32, the AD unit 40 determines whether or not the other vehicle 330 is flashing on and off the blinker 332r on the side of the approach road 322 (or the vehicle 10), in other words, whether or not the other vehicle 330 is sending a signal indicating that the other vehicle 330 is going to enter the approach road 322. This determination is performed based on, for example, the image information Iimage from the external cameras 60. Alternatively, the determination may be performed by communicating with the other vehicle 330 via the communication device 30.

If the blinker 332r on the side of the approach road 322 is flashing on and off (TRUE in S32), then the AD unit 40 determines that the other vehicle 330 has the intention of crossing in step S33. If it is not true (FALSE) in step S31 or S32, then the AD unit 40 determines that the other vehicle 330 does not have the intention of crossing in step S34.

(A-2-2-2-3. Determination of Whether Space Shv for Vehicle to Move is Left; S19 in FIG. 5)

As described above, the space Shv is a space for the vehicle 10 to move forward or backward to create the space St for the other vehicle 330 to cross the vehicle lane 312a. To determine whether the space Shv is left, the AD unit 40 calculates a required front distance Dfn, a required rear distance Drn, an allowable front distance Dfa, and an allowable rear distance Dra (FIG. 3).

The required front distance Dfn is the distance the vehicle 10 is required to move forward to enable the other vehicle 330 to cross the vehicle lane 312a and enter the approach road 322. In other words, the required front distance Dfn is the distance the vehicle 10 is required to move forward to ensure a passable rear distance Drp allowing passage at the rear area between the rear end 342 of the approach road 322 and the rear end of the vehicle 10 when viewed in the direction of travel of the vehicle 10. The passable rear distance Drp is set as the distance required for the other vehicle 330 to enter the approach road 322 in the direction of travel of the vehicle 10.

The required rear distance Drn is the distance the vehicle 10 is required to move backward to enable the other vehicle 330 to cross the vehicle lane 312a and enter the approach road 322. In other words, the required rear distance Drn is the distance the vehicle 10 is required to move backward to ensure a passable front distance Dfp allowing passage in the front area between the front end 340 of the approach road 322 and the front end of the vehicle 10 when viewed in the direction of travel of the vehicle 10. The passable front distance Dfp is set as the distance required for the other vehicle 330 to enter the approach road 322 in the direction of travel of the vehicle 10.

The allowable front distance Dfa is determined by subtracting a required interval Difn from a distance Df between the host vehicle 10 and the front vehicle 320b (that is, an external object located at a position closest to the host vehicle 10 in front of the host vehicle 10). In a case where there are no other vehicles (other vehicles 320a, 320b, and the like) in front of the host vehicle 10 within a predetermined distance, for example, in a case where the host vehicle 10 is stopped before a stop line 350 (FIG. 3), the distance Dfa is defined as the distance to a boundary, such as the stop line 350, to which the host vehicle 10 may move forward.

The allowable rear distance Dra is determined by subtracting a required interval Dirn from a distance Dr between the host vehicle 10 and the rear vehicle 320c (that is, an external host object located at a position closest to the vehicle 10 behind the host vehicle 10). In a case where there are no other vehicles (rear vehicle 320c and the like) behind the host vehicle 10 within a predetermined distance, the allowable rear distance Dra is set to the maximum value the allowable rear distance Dra may take.

In the case of FIG. 3, the allowable front distance Dfa is longer than the required front distance Dfn. Thus, the AD unit 40 determines that there is the space Shv in front of the host vehicle 10. Moreover, the allowable rear distance Dra is shorter than the required rear distance Drn. Thus, the AD unit 40 determines that there is no space Shv behind the host vehicle 10.

The method of moving the host vehicle 10 is not limited to this, and a method as described below is also possible.

<A-3. Effects of this Embodiment>

As described above, according to this embodiment, if it is determined that the presence of the host vehicle 10 prevents the other vehicle 330 (external object), having the intention of moving from the opposite lane 312b (second side lane) to the approach road 322 (first side lane), from crossing the vehicle lane 312a (FIG. 3 and TRUE in S15 in FIG. 5), then the host vehicle 10 is moved to create the space St for the other vehicle 330 to cross the vehicle lane 312a (S20). This enables the other vehicle 330 to cross the vehicle lane 312a and enter the approach road 322 (FIG. 4).

In this embodiment, the AD unit 40 (travel control device) determines the position Ps of the approach road 322 before the approach road 322 (first side lane) based on the output from the external environment sensor 20 (external environment detecting device), and stores the position Ps in the storage unit 124 (S13 in FIG. 5). Moreover, the AD unit 40 calculates the relative position P1 of the host vehicle 10 with respect to the position Ps of the approach road 322 stored in the storage unit 124 (S14).

This enables the relative position P1 of the host vehicle 10 with respect to the approach road 322 to be determined even in a case where the external environment sensor 20 (for example, the external cameras 60 or the LIDAR 64) does not detect immediately beside the host vehicle 10 or where the host vehicle 10 cannot detect the approach road 322 after being stopped immediately beside the approach road 322.

In this embodiment, the AD unit 40 (travel control device) sets the automatic stop factor F (storage condition) serving as the condition for storing the position Ps of the approach road 322 (first side lane) in the storage unit 124 (S11 in FIG. 5). If the automatic stop factor F exists (when the storage condition is met; TRUE in S11), then the AD unit 40 stores the position Ps of the approach road 322 in the storage unit 124 (S13). If the automatic stop factor F does not exist (when the storage condition is not met; FALSE in S11), then the AD unit 40 restrains the position Ps of the approach road 322 from being stored in the storage unit 124. As described above, the automatic stop factor F includes a state where the host vehicle 10 is decelerating. Thus, the position Ps of the approach road 322 is stored only when the position Ps of the approach road 322 needs to be stored. This reduces the computing load.

In this embodiment, the AD unit 40 (travel control device) erases the position Ps of the approach road 322 from the storage unit 124 (S22) after the host vehicle 10 has passed by the approach road 322 (first side lane) (TRUE in S21 in FIG. 5). Thus, the position Ps of the approach road 322 is stored only when the position Ps of the approach road 322 may be used. This reduces the required storage area.

In this embodiment, the external environment sensor 20 (external environment detecting device) detects the front vehicle 320b in the vehicle lane 312a and the rear vehicle 320c in the vehicle lane 312a. Moreover, if the host vehicle 10 detects that the other vehicle 330 (external object) is sending a signal indicating that the other vehicle 330 has the intention of entering the approach road 322 (first side lane) from the opposite lane 312b (second side lane) (TRUE in S32 in FIG. 6) while being stopped in front of the approach road 322 (first side lane) in the vehicle lane 312a (TRUE in S15 in FIG. 5), then the AD unit 40 (travel control device) determines whether or not the space St for crossing can be created by bringing the vehicle 10 close to the front vehicle 320b or the rear vehicle 320c (S19 in FIG. 5) based on the distance Df (first distance) between the host vehicle 10 and the front vehicle 320b, the distance Dr (second distance) between the host vehicle 10 and the rear vehicle 320c, and the relative position P1 of the host vehicle 10 with respect to the approach road 322 (first side lane). If the AD unit 40 determines that the space St for crossing can be created (TRUE in S19), then the host vehicle 10 is brought close to the front vehicle 320b or the rear vehicle 320c to create the space St for crossing (S20).

This enables the space St for the other vehicle 330 to cross the vehicle lane 312a to be created even when there are the front vehicle 320b and the rear vehicle 320c in front of and behind the host vehicle 10, respectively.

In this embodiment, if the space St for crossing can be created both in front of and behind the host vehicle 10, then the AD unit 40 (travel control device) brings the host vehicle 10 close to the front vehicle 320b (S20 in FIG. 5). The approach of the host vehicle 10 may surprise the occupant in the rear vehicle 320c more compared with the occupant in the front vehicle 320b since backward is the direction opposite the direction of travel. In this embodiment, forward movement takes precedence over backward movement not to surprise the occupant in the rear vehicle 320c.

B. Modification

The present invention is not limited to the above-described embodiment, and may adopt various configurations based on the description of the specification. For example, the present invention may adopt a configuration below.

<B-1. Object to be Applied>

In this embodiment, the AD unit 40 is applied to the vehicle 10 serving as an automobile (FIGS. 3 and 4). However, the present invention is not limited to this when attention is paid to, for example, the crossing assistance control. For example, the AD unit 40 may also be a vehicle (or a movable body) such as a train, a ship, or a drone.

<B-2. Vehicle 10>

[B-2-1. Automated-Driving Control]

In the above-described embodiment, the vehicle 10 is driven on the left side of the road (FIGS. 3 and 4). However, the present invention is applicable to a case where the vehicle 10 is driven on the right side of the road by paying attention to, for example, the crossing assistance control.

The vehicle 10 (AD unit 40) according to the above-described embodiment performs the automated-driving control enabling the vehicle 10 to be driven to the destination Ptar without requiring driving operations (acceleration, deceleration, steering, and gear shifting) by the driver. However, the present invention is not limited to this when attention is paid to, for example, the crossing assistance control. For example, the present invention is applicable to the vehicle 10 performing the automated-driving control enabling only automatic acceleration and deceleration.

[B-2-2. Crossing Assistance Control]
(B-2-2-1. Overall Crossing Assistance Control)

In the above-described embodiment, the crossing assistance control is performed for the other vehicle 330 (FIGS. 3 to 5). However, the present invention is not limited to this from the viewpoint of, for example, moving the host vehicle 10 to create the space St for the external object, having the intention of crossing the vehicle lane 312a, to cross the vehicle lane 312a. For example, the crossing assistance control may also be performed for bicycles or pedestrians.

In the above-described embodiment, the crossing assistance control is applied in the states illustrated in FIGS. 3 and 4. However, the present invention is not limited to this from the viewpoint of, for example, moving the host vehicle 10 to create the space St for the other vehicle 330 to cross the vehicle lane 312a. For example, contrary to the case illustrated in FIGS. 3 and 4, the present invention may also be applicable to a case where the other vehicle 330 has the intention of entering the opposite lane 312b (first side lane) from the approach road 322 (second side lane) of the parking lot 314.

Alternatively, in a case where the host vehicle 10 is allowed to stop in an intersection, the crossing assistance control may also be performed for the other vehicle 330 traveling on a road crossing the road 310 (vehicle lane 312a and the opposite lane 312b) on which the host vehicle 10 is traveling (in other words, the road in which the first side lane and the second side lane are straight and continuous).

In the above-described embodiment, the host vehicle 10 is movable both forward and backward to create the space St for the other vehicle to cross (S20 in FIG. 5). However, the present invention is not limited to this from the viewpoint of, for example, creating the space St for the other vehicle to cross, and the host vehicle 10 may be movable only forward or backward to create the space St for the other vehicle to cross.

(B-2-2-2. Determination of Intention of Crossing)

In the above-described embodiment, it is determined whether or not the other vehicle 330 has the intention of crossing in the steps illustrated in FIG. 6. However, the present invention is not limited to this from the viewpoint of, for example, determining whether or not the other vehicle 330 has the intention of crossing the vehicle lane 312a. For example, it may be determined whether or not the other vehicle 330 has the intention of crossing only in step S31 or S32 in FIG. 6. For example, in a case where step S31 is omitted and only the determination in step S32 is performed, it may be determined that the other vehicle 330 has the intention of crossing if the blinker 332r is flashing on and off in a direction crossing the vehicle lane 312a even when the other vehicle 330 is moving slowly without stopping. Alternatively, it may be determined that the other vehicle 330 has the intention of crossing if the target path of the other vehicle 330 provided through communication with the other vehicle 330 via the communication device 30 leads to the approach road 322.

(B-2-2-3. Determination of Approach Road 322)

In the above-described embodiment, it is determined whether or not the approach road 322 is present, and various operations are performed accordingly (S12 to S15, S21, S22, and the like in FIG. 5). However, the present invention is not limited to this from the viewpoint of, for example, creating the space St for crossing in response to the intention of the other vehicle 330 to cross the lane.

Figure 7:
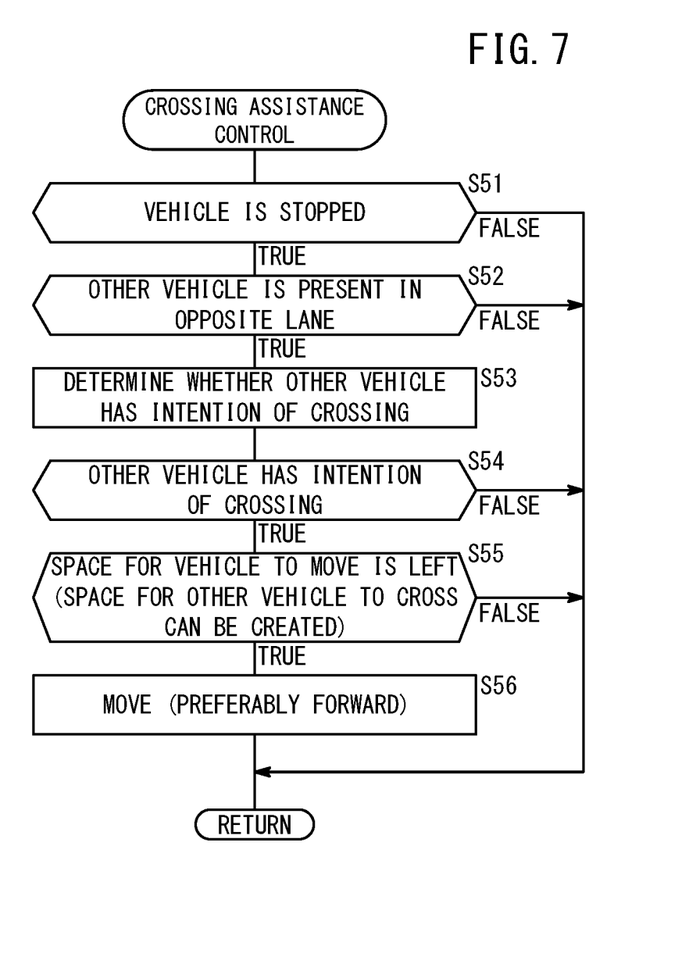
FIG. 7 is a flow chart illustrating the crossing assistance control according to a modification.

FIG. 7 is a flow chart illustrating the crossing assistance control according to a modification. In the modification in FIG. 7, it is not determined whether or not the approach road 322 is present. That is, in step S51, the AD unit 40 determines whether or not the host vehicle 10 is stopped. If the host vehicle 10 is stopped (TRUE in S51), then the process proceeds to step S52.

In step S52, the AD unit 40 determines whether or not the other vehicle 330 is present in the opposite lane 312b. This determination may be performed as in step S16 in FIG. 5 using the output from the external environment sensor 20. If the other vehicle 330 is present in the opposite lane 312b (TRUE in S52), then the process proceeds to step S53.

In step S53, the AD unit 40 determines whether or not the other vehicle 330 has the intention of crossing the vehicle lane 312a. This determination may be performed, for example, as in the case in FIG. 6. Alternatively, it may be determined with the above-described modification. If it is determined that the other vehicle 330 has the intention of crossing (TRUE in S54), then the process proceeds to step S55. Steps S55 and S56 are respectively similar to steps S19 and S20 in FIG. 5.

The travel control method according to the modification in FIG. 7 includes the step of detecting the other vehicle 330 (external object) in the opposite lane 312b (side lane) beside the host vehicle lane 312a in which the host vehicle 10 travels using the external environment sensor 20 (S52 in FIG. 7); the step of determining using the AD unit 40 (travel control device) whether or not the presence of the stopped (TRUE in S51) vehicle 10 prevents the other vehicle 330, having the intention of crossing the vehicle lane 312a, from crossing the vehicle lane 312a (S53 and S54); and if it is determined that the presence of the vehicle 10 prevents the other vehicle 330 from crossing the vehicle lane 312a (TRUE in S54), the step of moving the host vehicle 10 to create the space St for the other vehicle 330 to cross the vehicle lane 312a using the AD unit 40 (S56).

According to this modification, if it is determined that the presence of the stopped vehicle 10 prevents the other vehicle 330, having the intention of crossing the vehicle lane 312a, from crossing the vehicle lane 312a, the vehicle 10 is moved to create the space St for the other vehicle 330 to cross the vehicle lane 312a. This enables the other vehicle 330 to cross the vehicle lane 312a and enter the approach road 322 (another side lane).

<B-3. Other Features>

Flows illustrated in FIGS. 5 and 6 are used in the above-described embodiment. However, the details of the flows (the orders of the steps) are not limited to those described above when, for example, effects similar to the effects produced by the present invention are accomplished. For example, the order of steps S11 and S12 in FIG. 5 may be switched.

Although certain preferred embodiments of the present invention have been shown and described in detail, it should be understood that various changes and modifications may be made therein without departing from the scope of the appended claims.

What is claimed is:

1. A vehicle comprising:
   an external environment detecting device configured to detect a first side lane beside a host vehicle lane in which the vehicle is traveling and an external object in a second side lane lying on a side of the host vehicle lane opposite a side on which the first side lane lies; and
   a travel control device configured to:
   determine a position of the first side lane before reaching the first side lane based on output from the external environment detecting device and store the position in a storage unit, calculate a relative position of the vehicle with respect to the position of the first side lane stored in the storage unit, determine whether or not the vehicle blocks the external object having an intention of moving from the second side lane to the first side lane from crossing the host vehicle lane, move the vehicle, upon determining that the presence of the vehicle prevents the external object from crossing the vehicle lane, to create a space for the external object to cross the host vehicle lane.

2. The vehicle according to claim 1, wherein the travel control device is configured to:

set a storage condition serving as a condition for storing the position of the first side lane in the storage unit; and when the storage condition is met, store the position of the first side lane in the storage unit;

wherein the storage condition includes a state where the vehicle is decelerating.

3. The vehicle according to claim 1, wherein the travel control device is configured to erase the position of the first side lane from the storage unit after the vehicle starts to pass by the first side lane.

4. The vehicle according to claim 1, wherein the external environment detecting device is configured to detect an adjacent vehicle serving as at least one of a front vehicle and a rear vehicle in the host vehicle lane; and the travel control device is configured to:

observe whether or not the external object is sending a signal indicating that the external object is going to enter the first side lane from the second side lane while the vehicle is stopped in the host vehicle lane before the first side lane;

upon detecting the entrance signal, determine whether or not the space for crossing can be created by moving the vehicle in a direction toward the adjacent vehicle based on a distance between the vehicle and the adjacent vehicle and a relative position of the vehicle with respect to the first side lane; and upon determining that the space for crossing can be created, create the space for crossing by moving the vehicle in the direction toward the adjacent vehicle.

5. The vehicle according to claim 1, wherein the external environment detecting device is configured to detect a front vehicle in the host vehicle lane and a rear vehicle in the host vehicle lane; and the travel control device is configured to:

upon detecting a signal indicating that the external object is going to enter the first side lane from the second side lane while the vehicle is stopped in the vehicle lane before the first side lane, determine whether or not the space for crossing can be created by bringing the vehicle close to the front vehicle or the rear vehicle based on a first distance between the vehicle and the front vehicle, a second distance between the vehicle and the rear vehicle, and a relative position of the vehicle with respect to the first side lane; and upon determining that the space for crossing can be created both in front of and behind the vehicle, bring the vehicle close to the front vehicle.

6. A travel control device configured to:

acquire information about a first side lane and an external object from an external environment detecting device configured to detect the first side lane beside a host vehicle lane in which a host vehicle is traveling and the external object in a second side lane lying on a side of the host vehicle lane opposite a side on which the first side lane lies;

determine a position of the first side lane before reaching the first side lane based on output from the external environment detecting device and store the position in a storage unit;

calculate a relative position of the vehicle with respect to the position of the first side lane stored in the storage unit;

determine whether or not the host vehicle blocks the external object having an intention of moving from the second side lane to the first side lane from crossing the host vehicle lane; and move the host vehicle to create a space for the external object to cross the vehicle lane upon determining that the host vehicle prevents the external object from crossing the host vehicle lane.

7. A travel control method comprising the steps of:

determining a position of the first side lane before reaching the first side lane based on output from an external environment detecting device and store the position in a storage unit;

calculating a relative position of a host vehicle with respect to the position of the first side lane stored in the storage unit;

detecting an external object in a second side lane beside a host vehicle lane in which the host vehicle is traveling using the external environment detecting device;

determining whether or not the host vehicle stopped blocks the external object having an intention of crossing the host vehicle lane from crossing the host vehicle lane using a travel control device; and moving the host vehicle to create a space for the external object to cross the host vehicle lane using the travel control device upon determining that the vehicle blocks the external object from crossing the host vehicle lane.

* * * * *